UNITED STATES PATENT OFFICE.

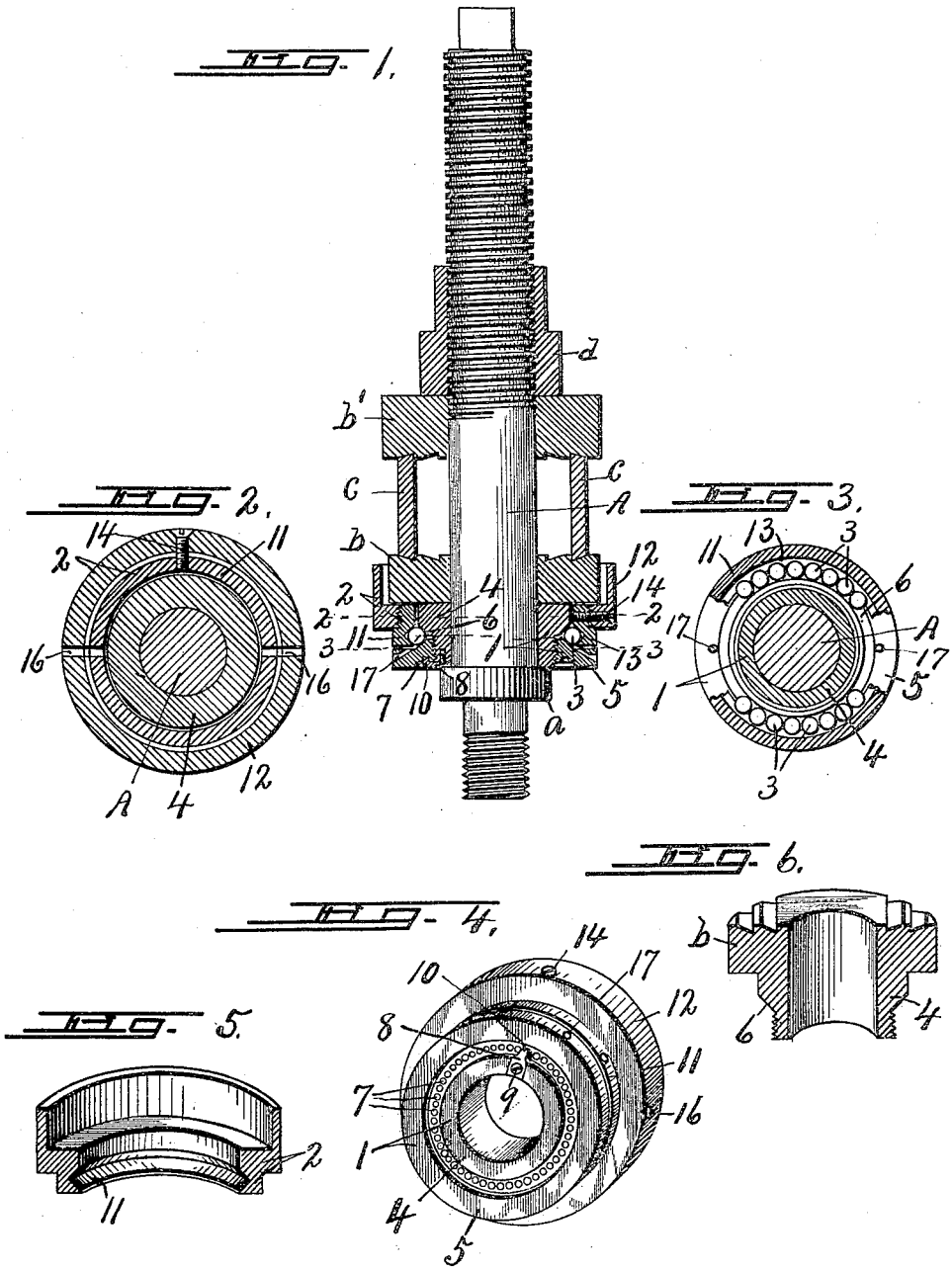

GEORGE V. FELLOWS, OF SYRACUSE, NEW YORK.

SHAPER-HEAD.

1,136,415. Specification of Letters Patent. Patented Apr. 20, 1915.

Application filed June 7, 1912. Serial No. 702,334.

*To all whom it may concern:*

Be it known that I, GEORGE V. FELLOWS, of Syracuse, in the county of Onondaga, in the State of New York, have invented new and useful Improvements in Shaper-Heads, of which the following, taken in connection with the accompanying drawings, is a full, clear, and exact description.

This invention relates to certain improvements in shaper heads somewhat similar to that set forth in my Patent #938,135 October 26, 1909 in which the primary object is to provide the shaper head with an auxiliary bearing collar co-axial with but rotatable independently of the cutter head so as to constitute a roller bearing for the edge of the pattern or work as the latter is moved relatively to the cutter head in the operation of shaping said work, thereby reducing friction and excessive wear upon the pattern and cutter head and avoiding to a large extent the dangers and difficulties incidental to this type of machines.

The device shown in my patent referred to is capable of carrying out every object stated therein but I have discovered that its efficiency may be greatly increased by bringing the anti-friction bearings between the bearing collar and cutter head farther in toward the axis thereof, the object of which is to further reduce the friction between said collar and cutter head and at the same time increase the inertia of the collar and permit the use of a wider range of sizes of bearing collars on the same size head.

Another object is to provide simple means for maintaining proper adjustment between the collar and cutter head to compensate for wear and prevent loss motion between such parts.

Other objects and uses will be brought out in the following description.

In the drawings—Figure 1 is a longitudinal vertical sectional view through a shaper head embodying the various features of my invention. Figs. 2 and 3 are horizontal sectional views taken respectively in planes 2—2 and 3—3, Fig. 1. Fig. 4 is a perspective view of a detached view of the lower portion of the cutter head showing the bearing collar and its adjustable supporting means. Fig. 5 is a sectional view of a slightly modified form of bearing collar made in one piece. Fig. 6 is a sectional view of a modified form of lower knife clamping collar also made in one piece.

The subject matter of my present invention is preferably made up as a unitary article of manufacture in standard sizes capable of being easily and quickly applied to any of the standard makes of shaper heads now in common use without any alteration thereof.

To this end the invention therefore comprises inner and outer co-axial collars —1— and —2— relatively rotatable one upon the other through the medium of interposed anti-friction ball bearings —3—, the inner collar —1— being mounted directly upon the shaper spindle —A— with its lower end resting against an annular flange or shoulder —a— which is rigid on the spindle. The opposite end of the collar —1— is engaged by one of a pair of knife clamping collars —b— and —b'— between which are clamped a pair of knives —c—, the outer end of the spindle being threaded and engaged by a nut —d— by which the collar —1— and knife clamping collars are frictionally clamped thereto between nut —d— at one end and the opposing flange or shoulder —a— at the opposite end.

The collar —1— although adjustable rotarily and axially when the clamping nut —d— is loosened is rigidly held by friction between the shoulder —a— and lower knife clamping collar —b— when the nut is tightened so as to cause said collar —1— to rotate positively with the spindle and cutter head. This collar —1— is preferably composed of an inner section —4—and an outer section —5—, the inner section —4— having a central bore fitting closely upon the spindle —a— but is of considerably less diameter than the adjacent knife clamping collar —b— so as to allow the bearings for the roller section —2— to be brought inwardly as close to the spindle as possible to reduce friction between the sections —1— and —2— and increase the inertia of the section —2— as will be hereinafter more fully described.

The lower end of the collar section —4— is reduced in diameter and threaded externally and upon this reduced threaded portion is screwed the internally threaded collar section —5—. The collar section —5— projects radially some distance beyond the periphery of the upper enlarged portion of the collar section —4— and forms therewith an annular ball-race or bearing —6— for the balls —3—.

One of the sections as —5— of the collar —1— therefore constitutes an adjustable bearing section for taking up wear in the ball bearings and in order that it may be held in its adjusted position against undue lateral movement or loosening, the lower face thereof is provided with a series of apertures or sockets —7— arranged circumferentially around the spindle in close proximity to each other and adapted to be engaged by a movable detent —8— which, in this instance, consists of a relatively small plate secured by suitable fastening means as a screw —9— to the lower end face of the collar section —4— as shown more clearly in Figs. 1 and 4, said detent having its outer end provided with a pin —10— adapted to enter any one of the sockets —7— which may be registered therewith when the detent is tightened.

In order that the lower end of the collar section —4— may abut firmly against the annular shoulder —a— on the spindle —A—, the detent —8— is let into a recess in the underside of the section —4— so as to be substantially flush therewith.

It is evident from the foregoing description that although the collar section —5— is adjustable for taking up wear of the bearings between the sections —1— and —2—, it is nevertheless readily locked to the section —4— and therefore rotates positively with the spindle when the section —4— is tightly clamped between the cutter head and annular shoulder —a— on the spindle by the tightening of the nut —d—.

The outer collar —2— constitutes what may be termed the collar bearing or rest against which the edge of the pattern or work is adapted to bear during its movement across the cutting edges of the cutter head in the operation of shaping the work, and for this purpose is journaled for independent rotary movement upon the inner collar —1— by means of the anti-friction ball bearings —3—. This roller section —2— is also preferably composed of inner and outer ring sections —11— and —12—, one of which as the inner section —11— is threaded externally and provided with an internal ball-race —13— registering with the ball-race —6— to form the outer bearing for the anti-friction balls —3—. The outer ring section —12— is threaded interiorly and screwed tightly upon the externally threaded portion of the ring —11— and is preferably locked thereto by one or more set screws —14— as shown more clearly in Figs. 1, 2 and 4.

The periphery of the outer ring section —12— is preferably smooth and cylindrical and extends upwardly some distance above the lower face of the knife clamping collar —b— around the periphery thereof but a sufficient distance below the lower edges of the knives to afford ample clearance for the relative rotation of the cutter head and bearing collar without friction one with the other. As a further precaution to prevent friction between the cutter head and bearing collar —2—, the upper end of the inner section —4— of the collar —1— projects a slight distance above the upper end of the ring section —11— of the collar bearing —2—, thereby affording ample clearance between the contiguous faces of the collar —2— and lower knife clamping head —b— and also between the contiguous faces of the collars —1— and —2—.

The outer bearing collar —2— is provided with one or more radial oil passages —16— leading from the periphery thereof to the ball bearings —3—, the section —5— of the inner collar —1— being also provided with radial oil passages —17— leading from the periphery thereof to the ball bearings.

In some instances, as, for example, in the manufacture of new shaper heads, it may be desirable to make the lower knife clamping collar —b— and inner section —4— of the collar —2— integral with each other as shown in Fig. 6 and although it is desirable to make the outer bearing collar —2— in two parts screwed together in the manner shown in Fig. 1, these parts may be integrally united in one piece as shown in Fig. 5.

What I claim is:

1. A shaper head comprising a spindle having an annular shoulder, a sleeve having a reduced threaded end resting against said shoulder, a cutter head engaged with the sleeve, means for clamping the cutter head and sleeve to the spindle to rotate therewith, an internally threaded bearing member screwed upon the lower reduced end of the sleeve for adjustment relatively thereto to compensate for wear, a detent recessed into the lower end of the sleeve and engaged with said bearing member to hold it in its adjusted position, and a collar having a reduced lower end journaled upon said bearing member and surrounding the lower end of the cutter head.

2. A shaper head comprising a spindle having an annular shoulder, a collar composed of inner and outer sections; the inner section having a reduced lower threaded end and the outer section threaded internally and secured upon said reduced end, said outer section being of greater diameter than the inner section and forming therewith a ball-race; a separate collar composed of inner and outer sections, the inner section surrounding the larger upper end of the inner section of the first named collar and provided with a ball-race registering with the first named ball-race; the outer section of the last named collar being secured upon the corresponding inner section; to permit it to be removed or replaced without removing its corresponding inner section or either of the sections of the first named collar.

In witness whereof I have hereunto set my hand on this 4th day of June 1912.

GEORGE V. FELLOWS.

Witnesses:
H. E. CHASE,
E. S. TUCKER.

Copies of this patent may be obtained for five cents each, by addressing the "Commissioner of Patents, Washington, D. C."